United States Patent [19]

Montanteme et al.

[11] 4,073,641
[45] Feb. 14, 1978

[54] SELECTIVE REDUCTION OF NICKEL ORE WITH A LOW NICKEL CONTENT

[75] Inventors: Jean Montanteme, Aiguebelle; André Greffe; François Grandjacques, both of Annecy, all of France

[73] Assignee: Societe Francaise d'Electrometallurigie, Paris, France

[21] Appl. No.: 774,976

[22] Filed: Mar. 7, 1977

Related U.S. Application Data

[63] Continuation-in-part of Ser. No. 545,081, Jan. 29, 1975, abandoned.

[30] Foreign Application Priority Data

Feb. 21, 1974  France .................................. 74 05879

[51] Int. Cl.$^2$ .............................................. C21C 5/52
[52] U.S. Cl. ...................................... 75/11; 75/10 R; 75/4; 75/21; 75/82
[58] Field of Search ....................... 75/3, 21, 82, 4, 11, 75/10 R

[56] References Cited

U.S. PATENT DOCUMENTS

| 3,307,927 | 3/1967 | Muschenborn | ............................ 75/3 |
| 3,503,734 | 3/1970 | Bell | .................................... 75/82 UX |

*Primary Examiner*—M. J. Andrews
*Attorney, Agent, or Firm*—Dennison, Dennison, Meserole & Pollack

[57] ABSTRACT

An extraction process for nickel, easily reducible as an alloy or in pure state, starting from an ore which contains nickel in a small amount simultaneously with large quantities of other less reducible metals, the extraction being achieved by heating the ore and a reducing mass to a high temperature, the reducing mass being provided by a quantity of the reducer, calculated so as to reduce the totality of the nickel, the cobalt present if any, and a small part of another reducible constituent such as iron present in the ore, being dispersed, or dissolved, in a quantity of matter wherein the volume of the reducer is present in a charge of the reducible substance in a ratio of about 1:3.

2 Claims, No Drawings

SELECTIVE REDUCTION OF NICKEL ORE WITH A LOW NICKEL CONTENT

This is a continuation-in-part of U.S. application Ser. No. 545,081, filed Jan. 29, 1975, now abandoned.

This invention relates to the processing of oxidized nickel ores, or of a nickel oxide mixture, or of oxidized nickel-containing slag with a low nickel content, out of which selective extraction of nickel as a metallic element is required. It more specifically relates to the preparation of the reaction charges of the ores or slag and a reducing agent for the included oxides, the charges being subjected in solid state, such as in briquet form, to a high temperature reduction together with, or followed by, the fusion of the components, which became fusible.

Normally nickel ore will contain several metallic oxides, for instance oxides of three metals A, B, and C out of which A, is nickel and is the easiest to be reduced and is a valuable element present in a small amount. If substantially the whole amount of nickel is to be extracted in metallic state, or pure, or as an alloy containing a high percentage of nickel, the quantity of the reducer used should be limited to small amounts so as to minimize the quantity of nickel in the residuum. This will allow obtaining substantially all the nickel by avoiding or limiting the reduction of B and of C.

In the prior art respective volumes of the reducer and of the ore that form the reaction charge conventionally are in a ratio of 1:10 or even 1:50. The even distribution of such a small amount of reducer in the charge is thus difficult to obtain by the prior art processes. Thus, in some portions of the charge, due to a relative lack of the reducer, a part of the oxide of nickel will not be reduced, while in other portions of the charge the reducer will be in excess and not only substantially reduce the total quantity of nickel, but also reduce an undesirable quantity of the oxides of B and of C. Thus, the utilization of the reducer will not be efficient and more importantly the elemental metal or alloy obtained will not be as rich in nickel as desired, and a part of the valuable nickel will be left in the slag.

French Patent No. 1,113,672, Apr. 3, 1956, and British Patent No. 795,812, May 28, 1958, considered to correspond thereto, disclose the desirability of providing a uniform mixture, or homogeneous dispersion of a heat carbonizable liquid fuel throughout a pulverized solid substance to be partially or completely reduced. Where such fuel is too highly viscous, even at slightly elevated temperatures, it may be dissolved in a suitable solvent, the mass of pulverized solid substance impregnated, and the impregnated mass subjected to an evaporation step with attendant recovery of the solvent.

However, there is no recognition of the problems attendant the selective recovery as practiced in the present process, as opposed to a partial or complete recovery as in prior art processes, of a constituent by establishing a predetermined relationship of reducer agent to a generally non-reducing agent to facilitate improved recovery of a selected reducible constituent of the material being treated.

U.S. Pat. No. 3,307,927 to Muschenborn et al. essentially describes a process of agglomeration, either of small particles of carbon to make briquettes or of dust particles which are to be recycled in manufacturing processes, or as stated therein relates to a process for the treatment of a great variety of solid particulate materials so that the same will be easier to store, handle, transport, or briquette. The amount of an emulsion used as an agglomerant is chosen not on the basis of the reducing capability, but merely to enhance agglomeration. There is no recognition in Muschenborn et al. of the problem dealt with herein, let alone a suggestion of a solution to the problem of the selective recovery of nickel from ore or slag having a low nickel content.

U.S. Pat. No. 3,502,461 to Güttler et al. describes a reduction process in two stages which reduction is not selective, but is a partial reduction. As recognized in the art, a selective reduction concerns substantially only a reduction of one of the reducible mineral constituents. On the other hand, a partial reduction concerns, to different degrees, a reduction of all of the reducible mineral constituents. Furthermore, there is no suggestion of dilution of a carbonaceous reducer in order to achieve the benefits derived from the practice of the present invention.

It is an object of the invention to overcome the difficulty encountered in the selective reduction of nickel ore, or the like, having a low nickel content in the order of about 2 to 3%.

According to the invention, the reaction charge which is to be introduced in the reducing and fusion apparatuses is prepared by at least two successive manipulative steps. In the first step, the amount of carbonaceous reducer required to reduce substantially all the nickel is calculated, as is understood in the art, and carefully dispersed in a suitable carrier mass so as to increase the volume of the reducer by dilution with the carrier and thus constitute a reducing mass having a volume substantially greater than that of the reducer per se and having a relationship, as will be discussed, that is a salient aspect of the invention.

The term "apparent volume" as used herein will be understood to define the volume of the reducer as increased by the carrier, which carrier is generally an inert diluent, such as water for example. However, in some instances the diluent utilized may comprise a carbonaceous substance, such as a liquid hydrocarbon that provides all the reducer or only has some reducing capability that is ancillary to the reducer per se.

In the second step this reducing mass is mixed with the other constituent parts of the reaction charge which may then be briquetted and subjected to reduction-fusion by conventional pyrometallurgical procedures.

According to the nature of the reducer and of the ore in which it is dispersed, there are several exemplary modes by which the first stage can be carried out.

In the first mode, when the reducer is a liquid, for instance hydrocarbon fuel, an emulsified reducing mass is obtained by adding a wetting agent and water.

In a second mode, the reducer, consisting of pitch or a heavy hydrocarbon fraction, is thinned by being dissolved in a solvent.

In a third mode, the reducer, a solid for instance, of silicon or ferro-silicon, is suspended in a liquid, such as water, or a very light hydrocarbon oil fraction.

A fourth mode consists of using a particulate solid reducer, for instance coke, coal or ferro-silicon, which is very thoroughly mixed with solid particulate matter which could be a part of the nickel ore itself or of nickel containing slag, the reducer and the other solid matter having previously been crushed to a high degree of fineness.

The ratio between the volume of the substance to be treated and of that of the reducing mass may vary with the product to be treated according to its physical and chemical characteristics. In any case, it is critical that the ratio between the reducing mass volume and the volume of the substance to be reduced should be in the order of no higher than about 1:3.

Therefore, the salient aspect of the invention process for the selective reduction of nickel ore or nickel containing slag resides in increasing the volume of the reducing mass within the above critical parameter to substantially insure its homogeneous distribution in the reduction charge.

Thus, the reducing mass volume and the volume of the reaction charge will no longer be a ratio of 1:10 or 1:50 ratio as in the prior art reduction process.

In the present process the volume of the "reducing mass" is at least three times higher than in the prior art ratios. Preferably, the reducing mass volume will be chosen so much the higher, the initial ratio between the volumes of the reducer and the product to be treated is the lower. This favors obtainment of high reduction yields as well as regularity of these yields.

The process is used to advantage in processing poor natural ores such as those of nickel and to recover nickel from metallurgical slag of low nickel content.

The examples given below illustrate a prior art process and the inventive process respectively.

EXAMPLE I

A nickel ore (garnierite) was used. Its ponderable composition was:

| | | | |
|---|---|---|---|
| NiO | 3.20% | (Ni | 2.52%) |
| CoO | 0.15% | (Co | 0.12%) |
| $SiO_2$ | 39.00% | | |
| $Al_2O_3$ | 3.80% | | |
| $Fe_2O_3$ | 24.30% | (Fe | 17.00%) |
| MgO | 18.50% | | |
| $Cr_2O_3$ | 0.35% | | |
| Fire losses | 10.70% | | |
| | 100.00% | | |

The problem to be dealt with is to obtain a ferronickel with at least 33% nickel, comprising practically the whole amount of nickel and cobalt of the ore. The carbon quantity which has to be added to reduce the total $Fe_2O_3$ to FeO and convert to the metallic state the nickel, the cobalt present and a part of the iron, was calculated to be about 32.8 kg per ton of dry ore which corresponded to 38.9 kg of the liquid fuel, i.e., reducer used, which corresponds to 43.2 liters. After being dried, the ore was crushed so that it would totally pass through a 1 mm mesh sieve. The crushed ore volume of the charge to the reduced was of the order of 1000 liters, considering that the density of the ore, crushed to powder, is of the order of 1. The volumes of the reducer and of the ore being thus in a ratio of about 1:23. It was difficult under these conditions to obtain a sufficiently honogeneous mixture of the reducer in the charge to be reduced in order to ensure the complete extraction of the nickel without reducing an excessive quantity of iron.

EXAMPLE II

An emulsion was formed to increase the apparent volume of the liquid fuel reducer as follows:

| | |
|---|---|
| 345 | liters of water |
| 43.2 | liters of liquid fuel, i.e., reducer |
| 1.8 | liter of wetting agent |
| 390 | liters of emulsion |

The ore to be reduced, and the weight and volume of the charge was the same as in Example I.

The ratio between the volume of the reducer and that of the emulsion was 1:9. More significantly, the ratio of the apparent volume of the reducer emulsion, or "reducing mass" to that of the ore, which was in the order of 1,000 liters, was about 1:3. The crushed ore and the emulsion were thoroughly mixed, then the mixture was pelleted, then transferred into a rotary kiln, or a rotary bedplate furnace, where the drying of the pellets as well as the beginning of the reduction takes place. The hot pellets fell into an electric oven where the reduction and the fusion were completed.

After the separation of the liquid metal and the slag, 67.800 kgs of alloy having the given below composition were obtained:

| | |
|---|---|
| Ni | 36% |
| C | 0.040% |
| Si | 0.030% |
| Co | 1.79% |
| Fe | rest | as well as 782 kgs of slag containing 0.105% nickel. This corresponds to a nickel extraction yield of 96.8%. This excellent performance has been regularly obtained in repeated experiments utilizing the step of establishing the apparent volume of the reducer as disclosed.

We claim:

1. In a process for the selective reduction of oxidized metallic ore or slag containing a number of other metallic oxides and having a nickel oxide content in the order of about 2 to 3% in order to selectively extract from the ore or slag a substantial portion of the nickel present to the general exclusion of the other metallic oxides by admixture of a reducer and the ore or slag to be reduced to form a reaction charge, followed by subjecting the charge to pyrometallurgical reduction and fusion for recovery of the nickel as a nickel rich ferro-nickel alloy the improvement comprising preparing the reaction charge and recovering the ferro-nickel alloy as a melt by the sequential steps of:
   a) calculating the substantially precise amount of carbonaceous reducer necessary to reduce only the totality of the reducible nickel present in the ore or slag to limit the reduction of other metallic oxides;
   b) calculating the volume of the ore to be reduced;
   c) mixing said reducer with a carrier to provide a reducing mass such that the volume of the ore to be reduced will not exceed about three times the volume of the reducing mass;
   d) intimately admixing the reducing mass with the ore or slag to provide the reaction charge;
   e) subjecting the reaction charge to the pyrometallurgical reduction and fusion by beginning reduction in a rotary furnace and completing reduction in an arc furnace to provide a liquid metal and slag fusion product; and
   f) recovering the ferro-nickel melt from the fusion product.

2. The process of claim 1 wherein the reaction charge of (d) is pelleted.

* * * * *